United States Patent
Noda et al.

(10) Patent No.: US 8,408,716 B2
(45) Date of Patent: *Apr. 2, 2013

(54) IMAGE PROJECTION APPARATUS

(75) Inventors: Toshiyuki Noda, Utsunomiya (JP); Ayumu Kameoka, Utsonomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,903

(22) Filed: Nov. 18, 2011

(65) Prior Publication Data

US 2012/0062854 A1    Mar. 15, 2012

Related U.S. Application Data

(63) Continuation of application No. 12/187,045, filed on Aug. 6, 2008, now Pat. No. 8,061,852.

(30) Foreign Application Priority Data

Aug. 7, 2007    (JP) ................................. 2007-204920

(51) Int. Cl.
   *G03B 21/16*    (2006.01)
(52) U.S. Cl. .......................................................... 353/61
(58) Field of Classification Search .................... 353/52, 353/57, 58, 60, 61, 101; 165/253, 287
   See application file for complete search history.

(56) References Cited

U.S. PATENT DOCUMENTS

| 3,117,489 | A | * | 1/1964 | Wilton ............................. 353/60 |
| 4,786,947 | A | * | 11/1988 | Kosugi et al. .................... 355/30 |
| 6,554,432 | B2 |  | 4/2003 | Ohfune et al. |
| 6,710,762 | B1 |  | 3/2004 | Hasegawa |
| 7,075,596 | B2 |  | 7/2006 | Hosoda |
| 8,061,852 | B2 | * | 11/2011 | Noda et al. ...................... 353/61 |
| 2002/0001065 | A1 |  | 1/2002 | Takizawa et al. |
| 2002/0118342 | A1 |  | 8/2002 | Ohfune et al. |
| 2003/0025854 | A1 |  | 2/2003 | Hosoda |
| 2004/0189953 | A1 |  | 9/2004 | Wu et al. |

FOREIGN PATENT DOCUMENTS

| JP | 2000147661 A | 5/2000 |
| JP | 2002258238 A | 9/2002 |
| JP | 2003043577 A | 2/2003 |

OTHER PUBLICATIONS

Extended European Search Report issued Nov. 26, 2008 for EP 08161532.0.

* cited by examiner

*Primary Examiner* — Georgia Y Epps
*Assistant Examiner* — Don Williams
(74) *Attorney, Agent, or Firm* — Rossi, Kimms & McDowell LLP

(57) ABSTRACT

The image projection apparatus includes an exhaust air outlet through which an exhaust air flows out from an inside of the apparatus to an outside thereof, an air inlet through which an external air flows in from the outside of the apparatus to the inside thereof, a temperature detector that detects a temperature of the external air flowing into the inside of the apparatus through the air inlet, and a controller that performs a protection operation when one of a predetermined temperature corresponding to a temperature of the exhaust air and a predetermined temperature change caused by flowing in of the exhaust air through the air inlet is detected by the temperature detector. The apparatus enables quick detection of a state in which the exhaust air outlet is blocked to perform the protection operation.

9 Claims, 9 Drawing Sheets

IMAGE PROJECTION APPARATUS

CROSS-REFERENCE

This is a continuation of application Ser. No. 12/187,045 filed 6 Aug. 2008, now U.S. Pat. No. 8,061,852 issued on 22 Nov. 2011, the entire disclosure of which is herein incorporated by reference.

BACKGROUND OF THE INVENTION

The present invention relates to an image projection apparatus such as a liquid crystal projector, and more particularly to an air exhausting structure of the image projection apparatus.

The image projection apparatus (hereinafter referred to as projector) has an air exhausting structure, which forcibly exhausts air that has cooled a light source lamp or other heat generating devices (or exothermic devices) to the outside with a fan. However, when the projector is used in a state in which an exhaust air outlet of the projector is placed near an obstacle such as a wall (that is, in a state in which the exhaust air outlet is blocked), the cooling of the heat generating devices is obstructed, and this may cause trouble in the operation of the projector. Therefore, many projectors include a temperature sensor thereinside and have a protection function to warn a user or to turn off the light source lamp when an abnormal temperature increase is detected.

Japanese Patent Laid-Open No. 2002-258238 discloses a projector in which plural temperature sensors are provided thereinside to monitor the temperatures of respective portions inside the projector. Further, Japanese Patent Laid-Open No. 2003-043577 discloses a projector which includes a temperature sensor for detecting the temperature of an external air and another temperature sensor for detecting the temperature in the vicinity of the light source lamp, and turns off the light source lamp when the difference between the temperatures detected by these temperature sensors becomes large.

However, when the projectors disclosed in aforementioned Japanese Patent Laid-Open Nos. 2002-258238 and 2003-043577 are used in the state in which the exhaust air outlet is blocked, the temperature of the air around the light source lamp initially increases. Afterwards, a lamp case which is a heat insulating member surrounding the light source lamp is heated, and then a temperature increase is detected by the temperature sensor after the heat transmits to the air around the lamp case from it. In other words, the temperature increase of the light source lamp is detected after the heat transmits to the lamp case and the air therearound, so that the state in which the exhaust air outlet is blocked cannot be detected quickly.

A temperature sensor may be provided inside the lamp case. However, the temperature inside of the lamp case increases even under a normal usage condition. Therefore, a mechanical sensor using a bimetal is commonly used as the temperature sensor provided inside of lamp case. Furthermore, the mechanical sensor is used to forcibly turn off the light source lamp for final protection thereof, and it is not easy for a user to recover the projector from the state in which the mechanical sensor has been activated.

BRIEF SUMMARY OF THE INVENTION

The present invention provides an image projection apparatus capable of quickly detecting a state in which an exhaust air outlet is blocked and being easily recovered from a state in which a protection operation has been performed.

The present invention provides, according to an aspect thereof, an image projection apparatus that projects an image using light from a light source. The apparatus includes an exhaust air outlet through which an exhaust air flows out from an inside of the apparatus to an outside thereof, an air inlet through which an external air flows in from the outside of the apparatus to the inside thereof, a temperature detector which detects a temperature of the external air flowing into the inside of the apparatus through the air inlet, and a controller which performs a protection operation when one of a predetermined temperature corresponding to a temperature of the exhaust air and a predetermined temperature change caused by flowing in of the exhaust air through the air inlet is detected by the temperature detector.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

(Overall Configuration of Projector)

Figure 7:
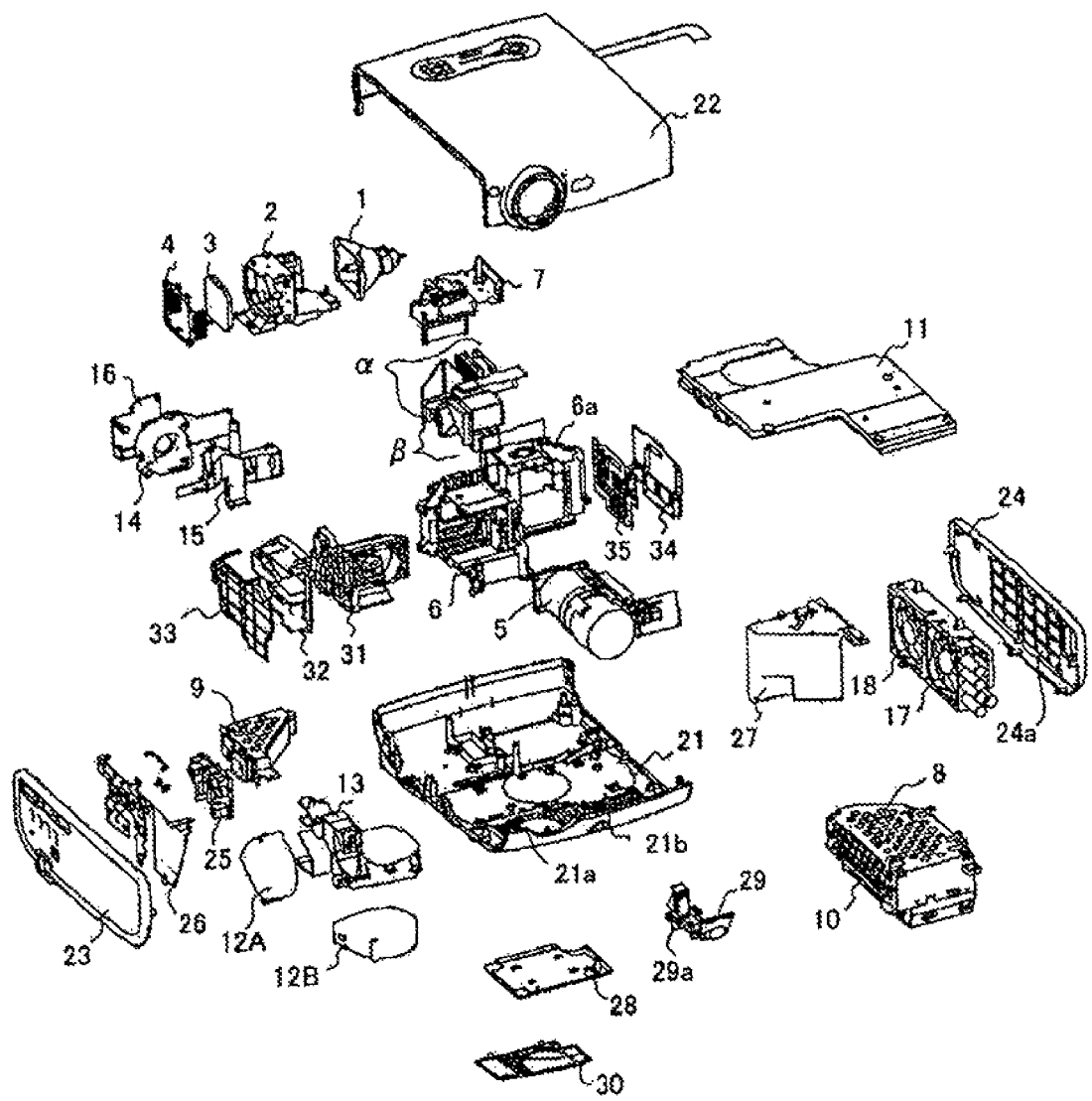
FIG. 7 is an exploded perspective view showing the projector of Embodiment 1.

FIG. 7 shows the configuration of a liquid crystal projector (image projection apparatus) that is a first embodiment (Embodiment 1) of the present invention.

In this figure, reference numeral 1 denotes a light source lamp (hereinafter referred to simply as "lamp"), which is an ultra high-pressure mercury discharge lamp in this embodiment. However, discharge lamps other than the ultra high-pressure mercury discharge lamp may be used as the lamp 1, such as a halogen lamp, a xenon lamp, and a metal halide lamp.

Reference numeral 2 denotes a lamp holder which holds the lamp 1, 3 an explosion-proof glass, and 4 a glass holder. Reference symbol α denotes an illumination optical system which converts light from the lamp 1 into collimated light with a uniform luminance distribution. Reference symbol β denotes a color separating/combining optical system. The color separating/combining optical system β separates the light from the illumination optical system α into a red (R) light component, a green (G) light component and a blue (B)

light component, guides them to liquid crystal panels for R, G, and B, respectively, and then combines the light components from the liquid crystal panels.

Reference numeral 5 denotes a projection lens barrel which projects the light from the color separating/combining optical system β onto a projection surface such as a screen, not shown. A projection optical system, described later, is housed in the projection lens barrel 5.

Reference numeral 6 denotes an optical box which accommodates the lamp 1, the illumination optical system α, and the color separating/combining optical system β, and to which the projection lens barrel 5 is fixed. The optical box 6 has a lamp case portion (hereinafter referred to simply as lamp case) 6a formed thereon, which surrounds the lamp 1.

Reference numeral 7 denotes an optical box lid which covers the optical box 6 accommodating the illumination optical system α and the color separating/combining optical system β. Reference numeral 8 denotes a PFC (Power Factor Correction) power supply board which generates DC power for each of circuit boards from a commercial power supply. Reference numeral 9 denotes a power supply filter board, and 10 a ballast power supply board which drives (lights) the lamp 1 together with the PFC power supply board 8.

Reference numeral 11 denotes a control board which drives the liquid crystal panels and controls lighting of the lamp 1 with power from the PFC power supply board 8.

Reference numerals 12A and 12B denote first and second optical system cooling fans, respectively, which take in air through an air inlet 21a formed in a lower exterior case 21, later described, to cool optical elements such as the liquid crystal panels and polarizing plates provided in the color separating/combining optical system β.

Reference numeral 13 denotes a first RGB duct which guides the cooling airflows from the first and second optical system cooling fans 12A and 12B to the optical elements in the color separating/combining optical system β.

Reference numeral 14 denotes a lamp cooling fan which sends a blowing airflow to the lamp 1 to cool it. Reference numeral 15 denotes a first lamp duct which holds the lamp cooling fan 14 and guides the cooling airflow to the lamp 1. Reference numeral 16 denotes a second lamp duct which holds the lamp cooling fan 14 and forms the duct together with the first lamp duct 15.

Reference numeral 17 denotes a power supply cooling fan which takes in air through an air inlet 21b formed in the lower exterior case 21 to circulate a cooling airflow within the PFC power supply board 8 and the ballast power supply board 10 to cool them. Reference numeral 18 denotes an exhaust fan which exhausts air that has been provided from the lamp cooling fan 14 to the lamp 1 and whose temperature is increased by cooling the lamp 1 through an exhaust air outlet 24a formed in a second side plate 24, later described.

The lower exterior case 21 accommodates the lamp 1, the optical box 6, the power supply system boards 8 to 10, the control board 11 and the like.

Reference numeral 22 denotes an upper exterior case which covers the lower exterior case 21 accommodating the optical box 6 and the like. Reference numeral 23 denotes a first side plate which covers side openings formed by the cases 21 and 22 together with the second side plate 24. The lower exterior case 21 has the abovedescribed air inlets 21a and 21b formed therein, and the side plate 24 has the exhaust air outlet 24a and an air inlet 24b formed therein. The lower exterior case 21, the upper exterior case 22, the first side plate 23 and the second side plate 24 constitute a chassis (case) of the projector.

Reference numeral 25 denotes an interface board on which connectors for receiving various signals are mounted, and 26 an interface reinforcement plate attached to the inside face of the first side plate 23.

Reference numeral 27 denotes an exhaust duct which guides a heated exhaust air from the lamp 1 to the exhaust fan 18 to prevent diffusion of the exhaust air in the chassis.

Reference numeral 28 denotes a lamp lid. The lamp lid 28 is removably provided on the bottom of the lower exterior case 21 and is fixed thereto by screws, not shown. Reference numeral 29 denotes a set adjustment leg. The set adjustment leg 29 is fixed to the lower exterior case 21, and the height of its leg 29a is adjustable. The adjustment of the height of the leg 29a enables adjustment of an inclination angle of the projector.

Reference numeral 30 denotes an RGB air intake plate which holds a filter, not shown, attached to the outside of the air inlet 21a formed in the lower exterior case 21.

Reference numeral 31 denotes a prism base which holds the color separating/combining optical system R. Reference numeral 32 denotes a box side cover which has duct-shaped portions for guiding the cooling airflows from the first and second optical system cooling fans 12A and 12B for cooling the optical elements and the liquid crystal panels in the color separating/combining optical system β. Reference numeral 33 denotes a second RGB duct which forms the duct together with the box side cover 32.

Reference numeral 34 denotes an RGB board to which flexible boards extending from the liquid crystal panels disposed in the color separating/combining optical system β are connected and which is connected to the control board 11.

Reference numeral 35 denotes an RGB cover which prevents electrical noise from entering the RGB board.

(Cooling Structure)

Next, the cooling structure in the projector of the present embodiment will be explained with reference to FIG. 8. As described above, this projector accommodates therein five fans 12A, 12B, 14, 17, and 18 for flowing airs in plural airflow paths described below to cool their respective cooling targets.

Figure 8:
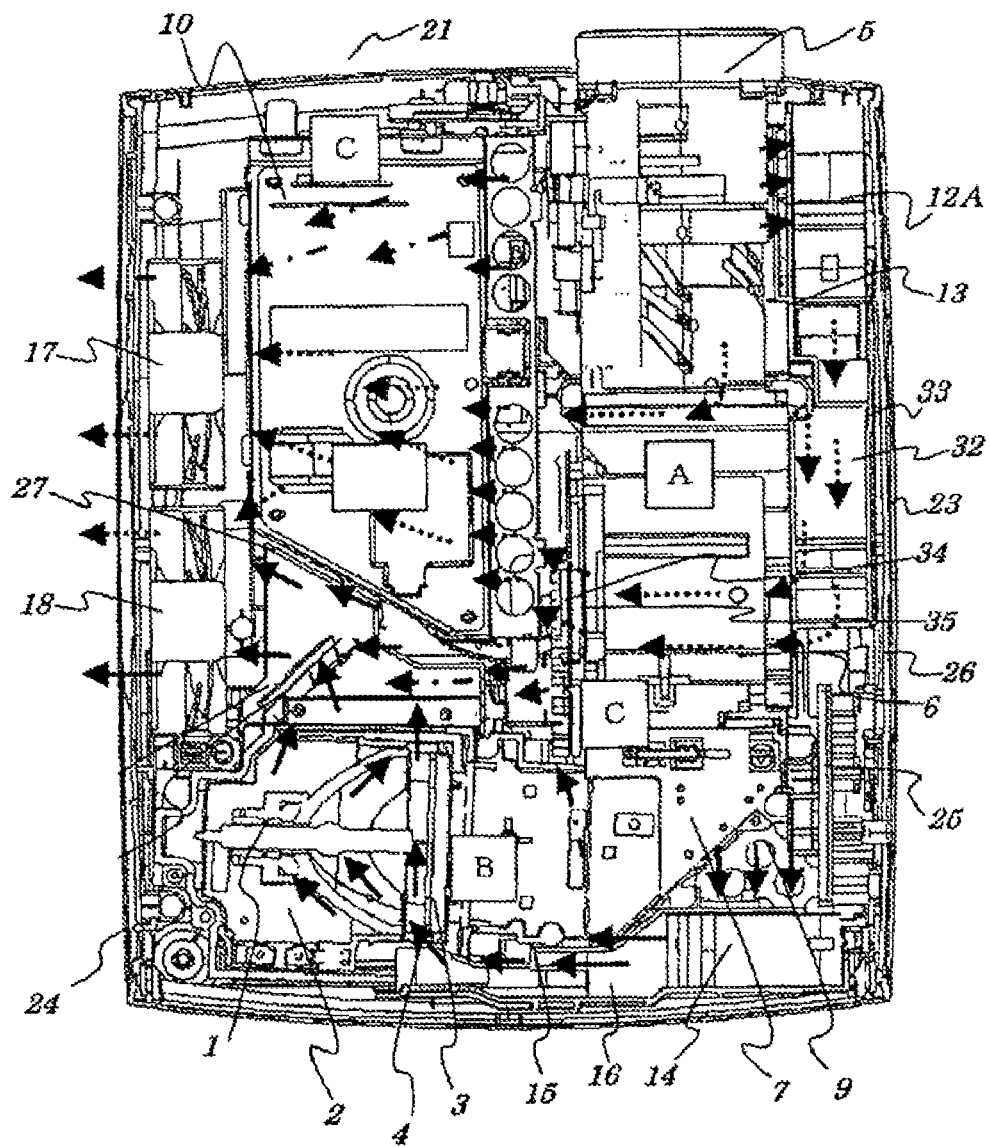
FIG. 8 is a plane view showing cooling airflows in the projector of Embodiment 1.

In an airflow path B indicated by solid-line arrows in FIG. 8, an air sucked into the chassis by the lamp cooling fan 14 is fed as a cooling air through the ducts 15 and 16 to the lamp 1. The airflow having cooled the lamp 1 is guided into the exhaust duct 27 to be exhausted to the outside of the chassis by the exhaust fan 18.

In an airflow path A indicated by dotted-line arrows in FIG. 8, an air sucked by the first and second cooling fans 12A and 12B from the outside of the chassis flows into the airflow path A through the air inlet 21a formed below the projection lens barrel 5. The second cooling fan 12B is disposed below the projection lens barrel 5.

A cooling air formed by this air cools the optical elements in the color-separating/combining optical system β housed inside the optical box 6. Most of this cooling air flows toward the PFC power supply board 8 and the ballast power supply board 10 adjacent to the optical box 6 to cool the electrical devices mounted on these boards 8 and 10. After that, the cooling air is exhausted to the outside of the chassis by the exhaust fan 18 and the power supply cooling fan 17.

In an airflow path C indicated by one-dot-chain-line arrows in FIG. 8, an air sucked through the air inlet 21b (not shown in FIG. 8) formed in the lower exterior case 21 flows into the airflow path C. A cooling air formed by this air is guided toward the ballast power supply board 10 and the PFC power supply board 8 together with an air inside the chassis by a sucking force of the power supply cooling fan 17 or the exhaust fan 18. After cooling these boards 8 and 10, the cooling air is exhausted to the outside of the chassis by the power supply cooling fan 17 and the exhaust fan 18.

Figure 1:
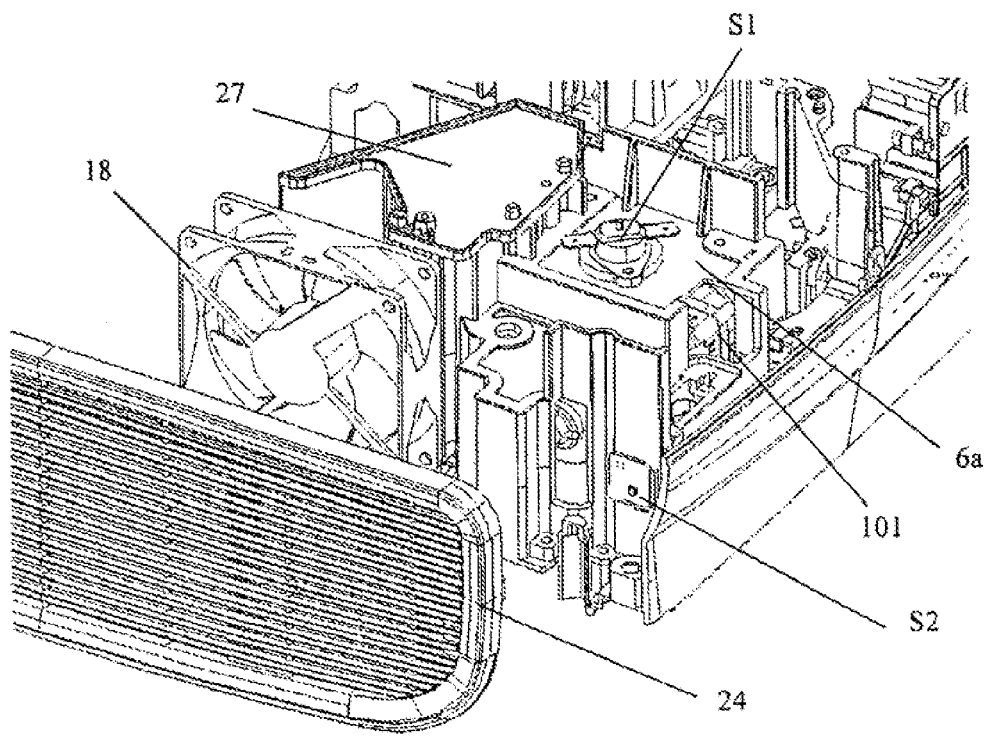
FIG. 1 is a perspective view showing the air exhaust and intake structure around a lamp in a projector, which is a first embodiment (Embodiment 1) of the present invention.
Figure 2:
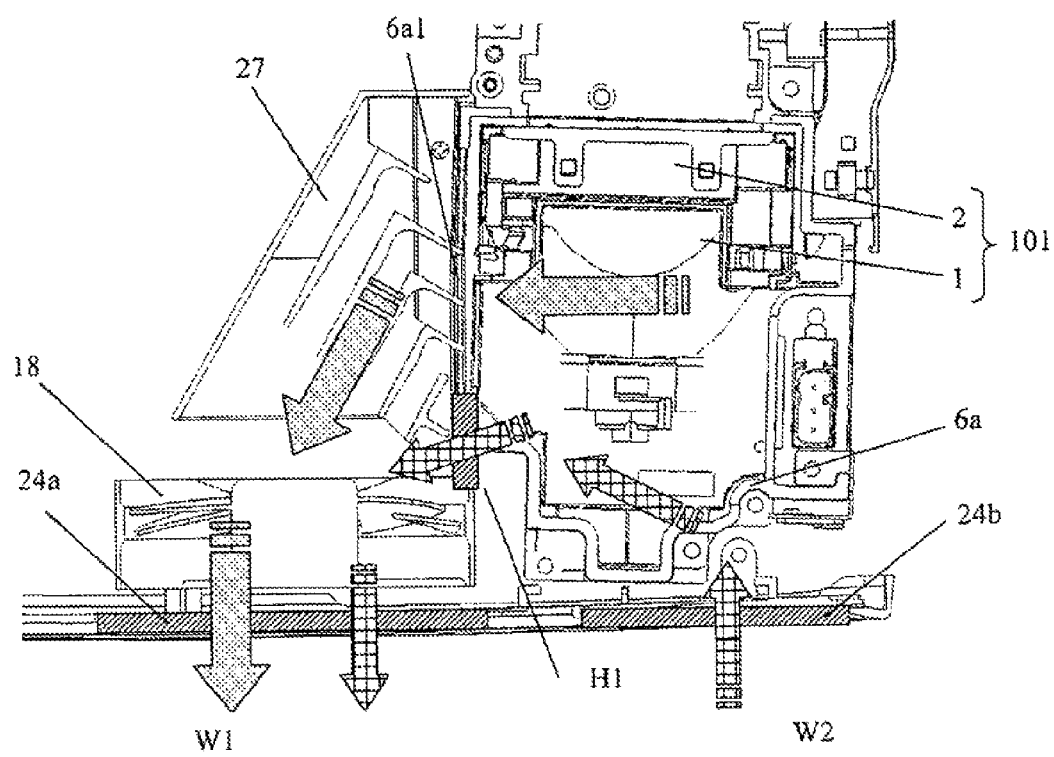
FIG. 2 is a sectional view showing the air exhaust and intake structure in Embodiment 1.

The air exhaust and intake structure around the lamp 1 in the abovedescribed cooling structure will be explained in detail with reference to FIGS. 1 and 2. FIG. 2 shows a cross-sectional view of the lamp case 6a and the exhaust duct 27 shown in FIG. 1.

A lamp unit 101, constituted by the lamp 1 as a heat generating member and the lamp holder 2 which holds the lamp 1, is housed in the inside of the lamp case 6a which is the lamp-housing member as a heat insulating member. An opening for exhausting heat is formed in the lamp case 6a, and it is connected to an opening (inflow opening) formed in the exhaust duct 27. Another opening (outflow opening) formed in the exhaust duct 27 is formed so as to face an air intake plane of the exhaust fan 18.

Thereby, an air in the lamp case 6a passes through the inside of the exhaust duct 27 and reaches the exhaust fan 18, and then is exhausted to the outside through the exhaust air outlet 24a formed in the downstream side from the exhaust fan 18. As described above, the exhaust air outlet 24a is formed in the second side plate 24 which constitutes part of the exterior surface of the projector.

In such a configuration, since the lamp 1 generates much heat in its lighting state, the inside of the lamp case 6a becomes a high temperature of nearly 200° C. Therefore, the exhausted air from the exhaust air outlet 24a becomes a high temperature even if a cold external air is mixed with the hot air after having cooled the lamp 1.

A main airflow W1, from the lamp unit 101 until being exhausted to the outside of the projector, flows through the abovementioned airflow path B. In addition to this, an airflow path to generate a sub airflow W2 is formed in the present embodiment. The configuration to form the airflow path for the sub airflow W2 will be explained below.

At first, the air inlet 24b is provided at the position adjacent to (in the vicinity of) the exhaust air outlet 24a on the second side plate 24. In other words, the air inlet 24b and the exhaust air outlet 24a are provided on the same surface (second side plate 24) of plural exterior surfaces (upper, lower and four side exterior surfaces) of the projector. Hereinafter, the exterior surface where the exhaust air outlet 24a (and the air inlet 24b) is provided is referred to simply as exhaust surface of the projector.

Further, in the vicinity of the connecting portion of the exhaust fan 18 and the exhaust duct 27, an aperture (gap) H1 is formed to form an airflow from the peripheral region of the lamp case 6a to the exhaust fan 18.

In such a configuration, when the exhaust fan 18 is driven, a negative pressure is created on an intake side of the exhaust fan 18, and the airflow W1 passing through the inside of the lamp case 6a and the airflow W2 passing through an outer peripheral region of the lamp case 6a are formed.

Inside the lamp case 6a, a first temperature sensor S1 is provided which detects a temperature inside the lamp case 6a. A second temperature sensor S2 which detects a temperature (ambient temperature) of an air (external air) flowing in through the air inlet 24b formed in the second side plate 24 is provided in a region in the vicinity of the air inlet 24b (region facing an outer surface of the lamp case 6a and the air inlet 24b). The second temperature sensor S2 corresponds to a "temperature detector", and the first temperature sensor S1 corresponds to "another temperature detector".

In a state in which the exhaust air outlet 24a is not covered (blocked) by an obstacle which will be described later, the second temperature sensor S2 can detect a temperature equivalent to an external air temperature (for example, a temperature in a room in which the projector is installed) even though it is disposed in the vicinity of the lamp case 6a.

The first temperature sensor S1 is a mechanical sensor which uses a bimetal and the like to be able to protect the lamp 1 even if other temperature sensors including the second temperature sensor S2 break down. Also, the first temperature sensor S1 has a function to block an electric current which lights the lamp 1 in a case where the temperature detected by the first temperature sensor S1 exceeds a certain temperature (temperature higher than detection temperature ranges of the other temperature sensors).

In contrast, the second temperature sensor S2 is a temperature sensor that uses an IC element, and outputs an electrical signal indicating the detected temperature. Therefore, electrical control based on the output of the second temperature sensor S2 can be performed.

Figure 3:
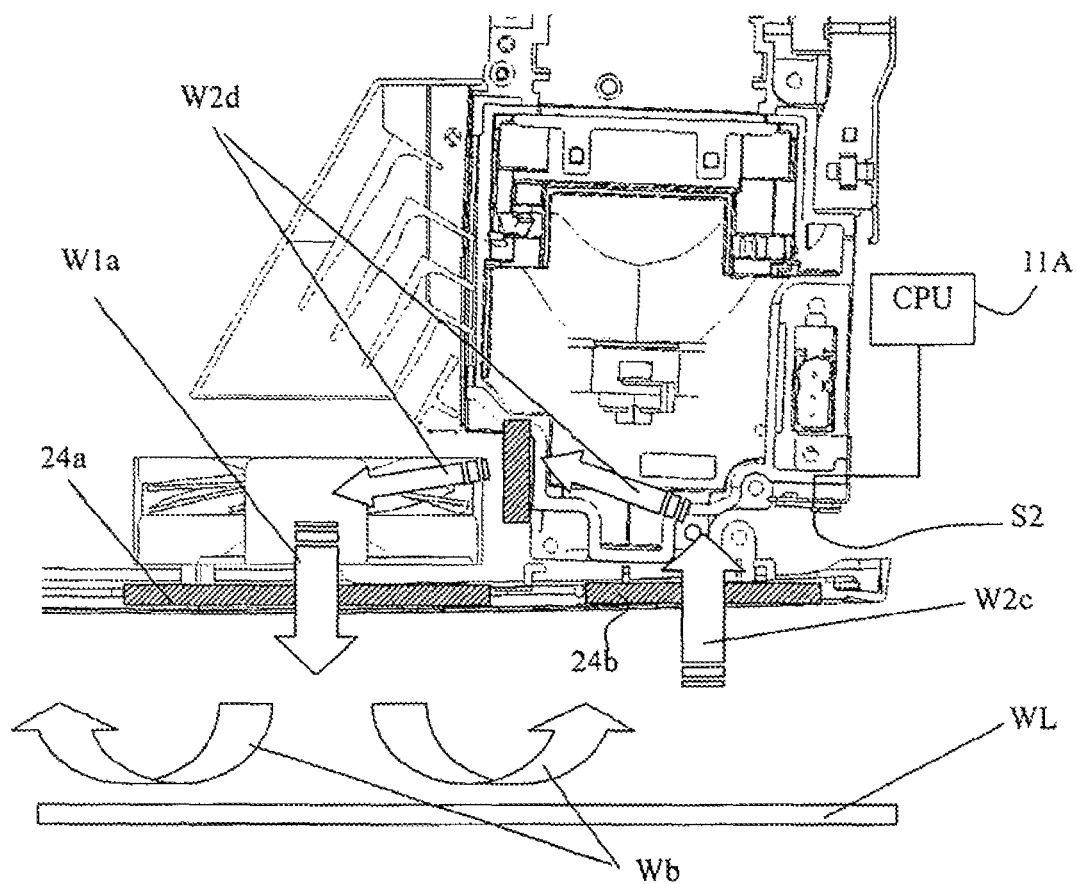
FIG. 3 is a sectional view showing airflows in the air exhaust and intake structure in Embodiment 1.

FIG. 3 shows the state in which the projector is placed with the exhaust surface being close to an obstacle (external object) WL such as an indoor wall. Hereinafter, such a state is referred to as "state in which the exhaust surface (exhaust air outlet 24a) is blocked".

In this state, the progress of an air W1a exhausted to the outside through the exhaust air outlet 24a is blocked by the obstacle WL, and thus the air W1a spreads out as shown by arrows Wb along the obstacle WL.

As described above, the negative pressure is created on the intake side of the exhaust fan 18. Therefore, a negative pressure is generated also inside of the air inlet 24b formed adjacent to the exhaust fan 18 and the exhaust air outlet 24a. Thus, an air W2c that is part of the exhausted air flows into the inside of the projector (chassis) through the air inlet 24b. The air W2c that has flowed into the inside of the projector is drawn by the exhaust fan 18 and returns (W2d) to the intake side of the exhaust fan 18. In this manner, in the state in which the exhaust surface is blocked, an exhaust airflow closed loop (W1a~Wb~W2c~W2d~W1a) is formed in which the air exhausted from the exhaust air outlet 24a is taken in again though the air inlet 24b.

As a result, the second temperature sensor S2 can detect the temperature of the exhausted air W2c that has flowed into the inside of the projector through the air inlet 24b. In other words, the exhaust airflow closed loop described above is instantly formed when the exhaust surface is blocked. Therefore, the temperature of the exhausted air that has flowed into the inside of the projector can be quickly (sensitively) detected by the second temperature sensor S2, and thereby, as will be described later, a user can be quickly alerted about the state in which the exhaust surface is blocked.

Figure 4:
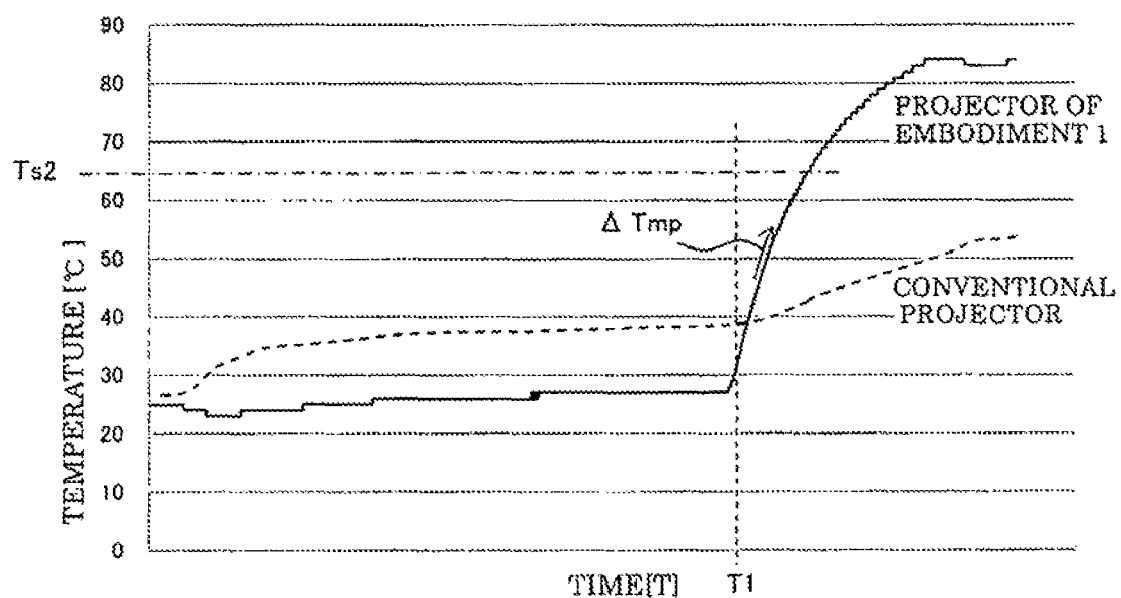
FIG. 4 is a graph diagram showing changes in temperature detected by a temperature sensor in the projector of Embodiment 1 and in a conventional projector.

FIG. 4 shows the results of experiments performed using a projector employing the abovedescribed configuration and a conventional projector not employing the abovedescribed configuration. A dash-dot line graph shows a change in temperature detected by a temperature sensor provided outside of the lamp case and in its vicinity in a conventional projector which is not equipped with an air inlet at a position adjacent to an exhaust air outlet. A solid line graph shows a change in temperature detected by the second temperature sensor S2 in the projector of the present embodiment in which the air inlet 24b is formed adjacent to the exhaust air outlet 24a. Both projectors were set in the state in which the exhaust surface is blocked at a time T1.

In the conventional projector, in a state before the time T1 (normal state in which the exhaust surface is not blocked), the temperature detected by the temperature sensor increased slowly in accordance with the increase of the temperature around the lamp case 6a. Then, after the time T1, although the temperature detected by the temperature sensor increased further than that detected before the time T1, the rate of the temperature increase was not so high.

On the other hand, in the projector of the present embodiment, in the state before the time T1, since a cold external air is taken in around the lamp case 6a through the air inlet 24b, the temperature detected by the second temperature sensor S2 hardly increased at all. However, immediately after the time T1, the temperature detected by the second temperature sensor S2 increased rapidly. Further, the temperature increased much higher than in the conventional projector.

As can be understood from the comparison of these graphs, the state in which the exhaust surface is blocked can be detected by monitoring the temperature detected by the second temperature sensor S2 or the change thereof.

Figure 9:
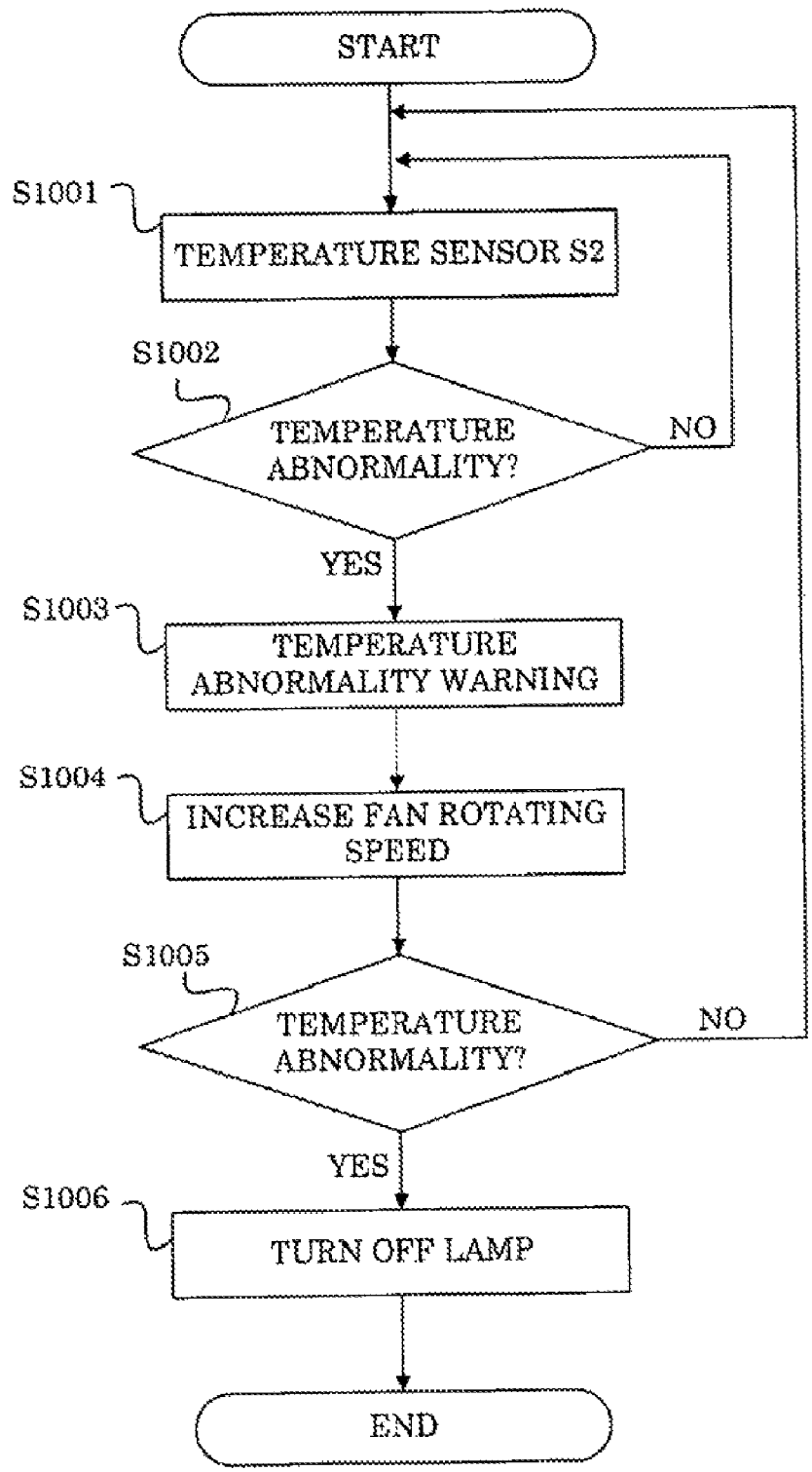
FIG. 9 is a flowchart showing a protection operation process in Embodiment 1.

The present embodiment uses this fact to perform a protection operation in response to the exhaust surface being blocked, according to a flowchart shown in FIG. 9. This protection operation is executed by a CPU (hereinafter referred to as controller) 11A which is mounted on the control board 11 shown in FIG. 7 according to a computer program stored in the CPU 11A.

In step (abbreviated as S in the figure) 1001, the controller 11A obtains an output (detected temperature) from the second temperature sensor S2. Next, in step 1002, the controller 11A determines whether or not the temperature detected by the second temperature sensor S2 is higher than a predetermined temperature (that is, whether or not a temperature abnormality is occurring). The predetermined temperature is a temperature corresponding to the temperature of the exhaust air flowing out through the exhaust air outlet 24a, and it is, for example, Ts2 (a temperature of around 65° C.) shown in FIG. 4.

The predetermined temperature Ts2 is a particular temperature detected by the second temperature sensor S2 in the state in which the exhaust surface is blocked. Therefore, detecting the predetermined temperature Ts2 enables an accurate determination of the state in which the exhaust surface is blocked.

The "temperature corresponding to the temperature of the exhaust air" includes the same temperature as that of the exhaust air and other temperatures such as an average temperature or a minimum temperature of the temperatures detected by the second temperature sensor S2 when the exhaust air flows into the inside of the projector through the air inlet 24b in experiments under various conditions.

Further, the predetermined temperature Ts2 is set lower than a temperature Ts1 at which the lamp 1 is turned off by the controller 11A in response to an operation of the first temperature sensor S1. In other words, the temperature Ts1 and the predetermined temperature Ts2 satisfy the relationship of: Ts1>Ts2.

Thereby, the temperature abnormality can be detected by using the second temperature sensor S2 prior to the detection thereof by the first temperature sensor S1.

When the temperature abnormality is not occurring in step 1002, the process returns to step 1001. On the other hand, when the temperature abnormality is occurring, the process advances to step 1003 where the controller 11A performs a first protection operation. In the first protection operation, the controller 11A displays a warning on a display part (not shown) which is provided on the upper exterior case 22 or generates a warning sound to inform the user of the temperature abnormality occurring due to the state in which the exhaust surface is blocked.

Next, in step 1004, the controller 11A performs a second protection operation. In the second protection operation, the controller 11A increases a rotating speed of the exhaust fan 18.

Next, in step 1005, the controller 11A obtains the output of the second temperature sensor S2 again. Then, the controller 11A again determines whether or not the temperature detected by the second temperature sensor S2 is higher than the abovedescribed predetermined temperature (that is, whether or no the temperature abnormality is occurring).

If the temperature abnormality has been resolved and thus the temperature abnormality is not occurring, the process returns to step 1001. On the other hand, if the temperature abnormality is occurring, the process advances to step 1006 where the controller 11A performs a third protection operation. In the third protection operation, the controller 11A turns off the lamp 1, and thus the process is finished.

In steps 1002 and 1005, the controller 11A may determine the presence or absence of a predetermined temperature change (a predetermined rate of the temperature increase per unit of time) which is shown by ΔTmp in FIG. 4 and caused by flowing in of the exhaust air through the air inlet 24b.

The predetermined temperature change ΔTmp is a particular temperature increase rate generated in the state in which the exhaust surface is blocked, so that detecting the predetermined temperature change ΔTmp enables an accurate determination of the state in which the exhaust surface is blocked.

The first temperature sensor S1 may be a temperature sensor using an IC element like the second temperature sensor S2. In this case, the temperature abnormality can be detected more sensitively by evaluating the product of the temperatures detected by both temperature sensors S1 and S2.

Note that it is not necessarily needed to perform all of the first to third protection operations. That is, it is only necessary to perform at least one of displaying the warning, generating the warning sound, turning off the lamp 1, and increasing the rotating speed of the exhaust fan 18.

Figure 5:
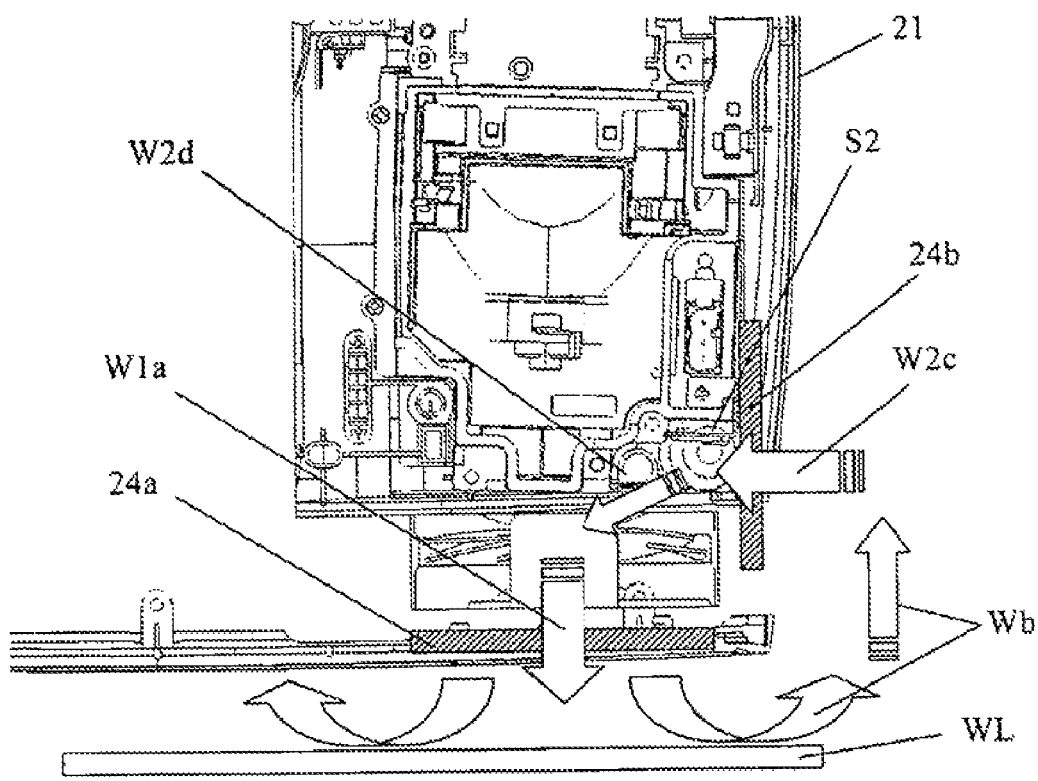
FIG. 5 is a sectional view showing a modified example of the air exhaust and intake structure in Embodiment 1.

Further, the present embodiment described the case where the air inlet 24b and the exhaust air outlet 24a are provided on the same exterior surface. However, as shown in FIG. 5, the air inlet 24b may be provided close to the exhaust air outlet 24a on an exterior surface (back surface of the lower exterior case 21) adjacent to the exhaust surface on which the exhaust air outlet 24a is provided. Even in this case, since an exhaust airflow closed loop (W1a~Wb~W2c~W2d~W1a) is formed in the state in which the exhaust surface is blocked, the same effect as that of the abovedescribed embodiment can be obtained.

Embodiment 2

Figure 6:
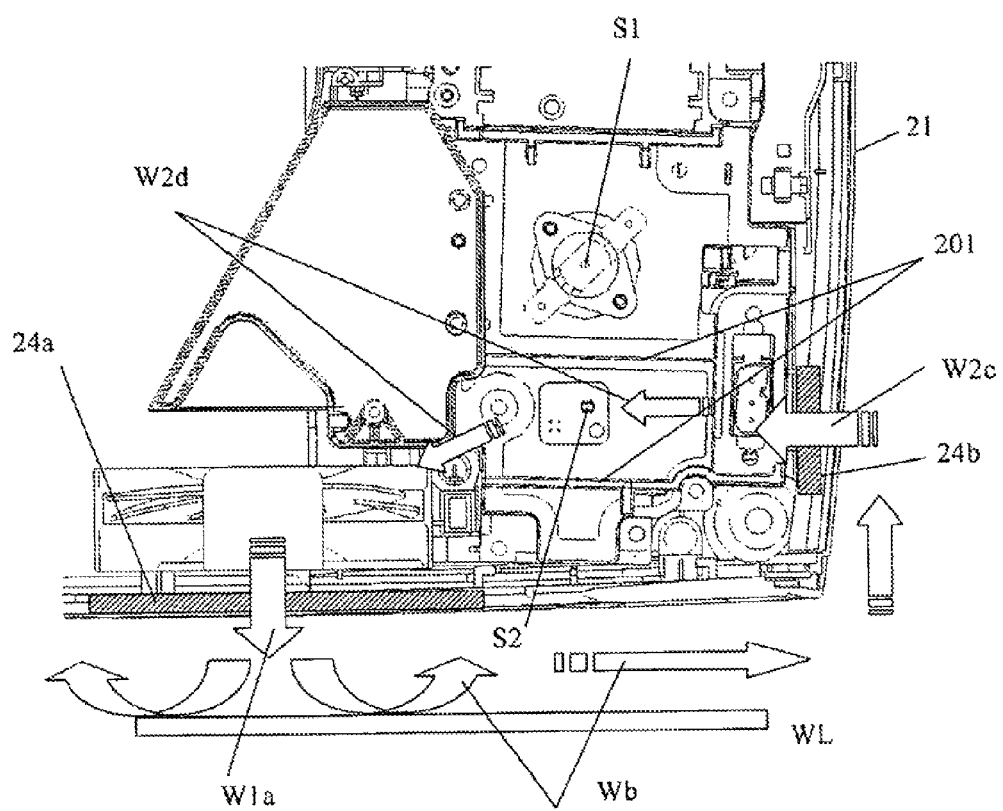
FIG. 6 is a sectional view showing the air exhaust and intake structure in a second embodiment (Embodiment 2) of the present invention.

FIG. 6 shows the air exhaust and intake structure around the lamp in a liquid crystal projector which is a second embodiment (Embodiment 2) of the present invention.

Embodiment 1 described the case where the second temperature sensor S2 is placed in the vicinity of the air inlet 24b. However, the second temperature sensor S2 may be placed at a position which will be explained below together with using an air-guiding member which will be explained below.

In the present embodiment, the air inlet 24b is provided near the exhaust air outlet 24a on an exterior surface (back surface of the lower exterior case 21) adjacent to the exhaust surface on which the exhaust air outlet 24a is provided. The air-guiding member 201 having a duct shape connects from the air inlet 24b and an intake surface of the exhaust fan 18.

Furthermore, the second temperature sensor S2 is placed inside of an airflow path surrounded by the air-guiding member 201.

The air-guiding member 201 reliably guides an air W2c flowing thereinto through the air inlet 24b to the second temperature sensor S2 in the state in which the exhaust surface is blocked by the obstacle WL and an exhaust airflow closed loop (W1a~Wb~W2c~W2d~W1a) is formed, in the same manner as in Embodiment 1 (FIG. 6). Therefore, in comparison with Embodiment 1, the second temperature sensor S2 can be placed at a position away from the air inlet 24b. In other words, the degree of freedom in placing the second temperature sensor S2 is improved.

Further, since an independent airflow path for the air W2c configuring the exhaust airflow closed loop can be formed inside the projector by providing the air-guiding member 201, the blocking of the exhaust surface can be detected more sensitively.

The control of the protection operation using the second temperature sensor S2 is the same as that in Embodiment 1.

According to each of the abovedescribed embodiments, the predetermined temperature corresponding to the exhaust air flowing into the apparatus through the air inlet or the predetermined temperature change caused by the flowing in of the exhaust air through the air inlet in the state in which the exhaust air outlet is blocked can be sensitively detected with the second temperature sensor S2. Thereby, the protection operation can be performed before an excessive temperature increase inside of the projector occurs. Therefore, deterioration in lifetime of the lamp or damage due to heating of heat-vulnerable components such as optical elements can be avoided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the above embodiments described the configuration of the air exhaust part for the air that has cooled the lamp. However, a similar configuration may be employed in an air exhaust part for an air that has cooled a heat-generating device other than the lamp, such as the air exhaust parts in the airflow paths A and C shown in FIG. 8.

Further, for the projector, a transmissive liquid crystal panel and a digital micromirror device (DMD) may be used instead of the reflective liquid crystal panel.

This application claims the benefit of Japanese Patent Application No. 2007-204920, filed on 7 Aug. 2007, which is herein incorporated by reference in its entirety.

What is claimed is:

1. An image projection apparatus projecting an image using light from a light source, the image projection apparatus comprising:
   an exhaust air outlet through which an exhaust air flows out from an inside of the apparatus to an outside thereof;
   an air inlet through which an external air flows in from the outside of the apparatus to the inside thereof;
   a temperature detector that detects a temperature of the external air flowing into the inside of the apparatus through the air inlet; and
   a controller that performs a protection operation when one of a temperature being higher than a predetermined temperature corresponding to a temperature of the exhaust air or a temperature change being larger than a predetermined temperature change caused by flowing in of the exhaust air through the air inlet, is detected by the temperature detector,
   wherein the air inlet is adjacent to the exhaust air outlet.

2. An image projection apparatus according to claim 1, wherein the apparatus includes plural exterior surfaces, and the exhaust air outlet and the air inlet are provided on a same surface of the plural exterior surfaces.

3. An image projection apparatus according to claim 1, wherein the apparatus includes plural exterior surfaces, and the exhaust air outlet and the air inlet are provided on surfaces adjacent to each other of the plural exterior surfaces.

4. An image projection apparatus according to claim 1, further comprising an airflow path which guides the external air that has flowed into the inside of the apparatus through the air inlet to the exhaust air outlet.

5. An image projection apparatus according to claim 4, further comprising:
   an air-guiding member surrounding the airflow path,
   wherein the temperature detector is disposed inside of the air-guiding member.

6. An image projection apparatus according to claim 1, wherein:
   the exhaust air that has cooled the light source flows out from the exhaust air outlet, and
   the temperature detector is provided in a region facing an outer surface of a housing member that houses the light source and the air inlet.

7. An image projection apparatus according to claim 6, wherein:
   the temperature detector is provided to detect the predetermined temperature corresponding to the temperature of the exhaust air, and
   the apparatus further includes another temperature detector that operates at a temperature higher than the predetermined temperature.

8. An image projection apparatus according to claim 1, wherein the protection operation includes at least one of displaying a warning, generating a warning sound, turning off the light source, and increasing a rotating speed of a fan used for cooling the apparatus.

9. An image projection apparatus projecting an image using light from a light source, the image projection apparatus comprising:
   an exhaust air outlet through which an exhaust air flows out from an inside of the apparatus to an outside thereof;
   an air inlet through which an external air flows in from the outside of the apparatus to the inside thereof;
   a temperature detector that detects a temperature of the external air flowing into the inside of the apparatus through the air inlet; and
   a controller that performs a protection operation when one of a predetermined temperature corresponding to a temperature of the exhaust air, a temperature being higher than the predetermined temperature, a predetermined temperature change caused by flowing in of the exhaust air through the air inlet, or a temperature change being larger than the predetermined temperature change, is detected by the temperature detector,
   wherein the air inlet is adjacent to the exhaust air outlet.

* * * * *